United States Patent [19]

Wiatrowski et al.

[11] Patent Number: 5,521,941
[45] Date of Patent: May 28, 1996

[54] AUTOMATIC THRESHOLD CONTROL FOR MULTI-LEVEL SIGNALS

[75] Inventors: David G. Wiatrowski, Gurnee; Matthew R. Miller, Schaumburg; Christopher N. Kurby, Elmhurst, all of Ill.

[73] Assignee: Motorola, Inc., Schaumburg, Ill.

[21] Appl. No.: 620,601

[22] Filed: Nov. 29, 1990

[51] Int. Cl.[6] ................................................. H04L 25/06
[52] U.S. Cl. ........................ 375/287; 307/73; 375/317
[58] Field of Search ...................... 375/17, 76, 94, 375/99, 287, 317, 318, 319; 307/358, 359; 328/146, 147, 149, 164; 358/464; 327/307, 72, 73

[56] References Cited

U.S. PATENT DOCUMENTS

| | | | |
|---|---|---|---|
| 3,736,511 | 5/1973 | Gibson | 375/76 |
| 3,775,688 | 11/1973 | Hinoshita et al. | 375/17 |
| 4,236,256 | 11/1980 | Brackett et al. | 375/287 |
| 4,237,424 | 12/1980 | Weiner | 328/149 |
| 4,339,828 | 7/1982 | Predina et al. | 375/20 |
| 4,535,294 | 8/1985 | Ericksen et al. | 375/318 |
| 4,697,275 | 9/1987 | Laue | 375/76 |
| 4,792,991 | 12/1988 | Eness | 455/210 |
| 4,811,423 | 3/1989 | Eastmond | 455/203 |
| 4,829,594 | 5/1990 | Heck et al. | 455/334 |
| 4,847,865 | 7/1989 | Larson | 375/76 |
| 4,860,010 | 8/1989 | Iwamatsu | 375/287 |
| 4,873,702 | 10/1989 | Chiu | 307/359 |
| 4,914,418 | 3/1990 | Mak et al. | 375/76 |
| 5,097,486 | 3/1992 | Newby et al. | 375/317 |

*Primary Examiner*—Benedict V. Safourek
*Attorney, Agent, or Firm*—Susan L. Lukasik

[57] ABSTRACT

Symbol recovery for multi-level digital signals has traditionally been difficult because of the nature of the eye pattern output by the discriminator (103), and especially its response to a noisy or impeded signal environment. This method and apparatus for recovery thresholds adjusts (411 and 417) to the current state of the discriminator (103) output of the received signal, based on an attenuated (301) version of that signal. Using a fast adjust mode and slow adjust mode, the threshold generating circuitry (331 and 361) adapts to the signal based on data from the received signal fed into lock detectors (329 and 359) which determine the mode to use.

44 Claims, 5 Drawing Sheets

AUTOMATIC THRESHOLD CONTROL FOR MULTI-LEVEL SIGNALS

FIELD OF THE INVENTION

This invention relates to receiver and demodulator circuits. More particularly, this invention relates to demodulator circuits for multi-level digital signals.

BACKGROUND OF THE INVENTION

Multi-level digital signals are conventionally transmitted through a variety of media, for example, hard-wire lines, fiber optic cable, and radio communication links. These signals are transmitted at a known rate referred to as the data rate or clock signal frequency. During the course of the transmission, these signals often become degraded by receiver and transmitter component variations, noise, and other types of interference, causing fluctuations in the received signal. These fluctuations cause inaccurate demodulation at the receiver such that symbol errors occur, and, since symbols are comprised of bits, bit errors result, causing distortion in the reconstructed data.

The resultant fluctuations in the received signal are more destructive in a multi-level digital signal than in a binary signal because the levels being distinguished between are much closer in a multi-level signal because of limited signal bandwidth in FM signals and power limitations in linear systems. The digital discriminator output signal is described as an eye pattern, because of the shape the discriminator output takes on an oscilloscope display, and the distance between expected voltage levels in a digital signal is referred to as an eye opening. For example, an error-free binary signal may have an 6.0 V eye opening, and an error-free 4-level signal may have an opening of 2.0 V. When fluctuations or noise enter by or in the receiver, the opening of the eye tends to close, as would a human eye in a sandstorm. The smaller the eye opening, the more difficult it is to recover the data accurately. Simply fixing the decision threshold at the expected halfway point between adjacent symbol levels will not suffice further away from the center bias of the signal, as distortion is more likely to occur at those levels than near the center bias.

Accordingly, there is a need for a method of accurate symbol recovery for multi-level signals, which has symbol thresholds that can be adjusted to various forms of signal degradation.

DESCRIPTION OF PREFERRED EMBODIMENT

Figure 1:
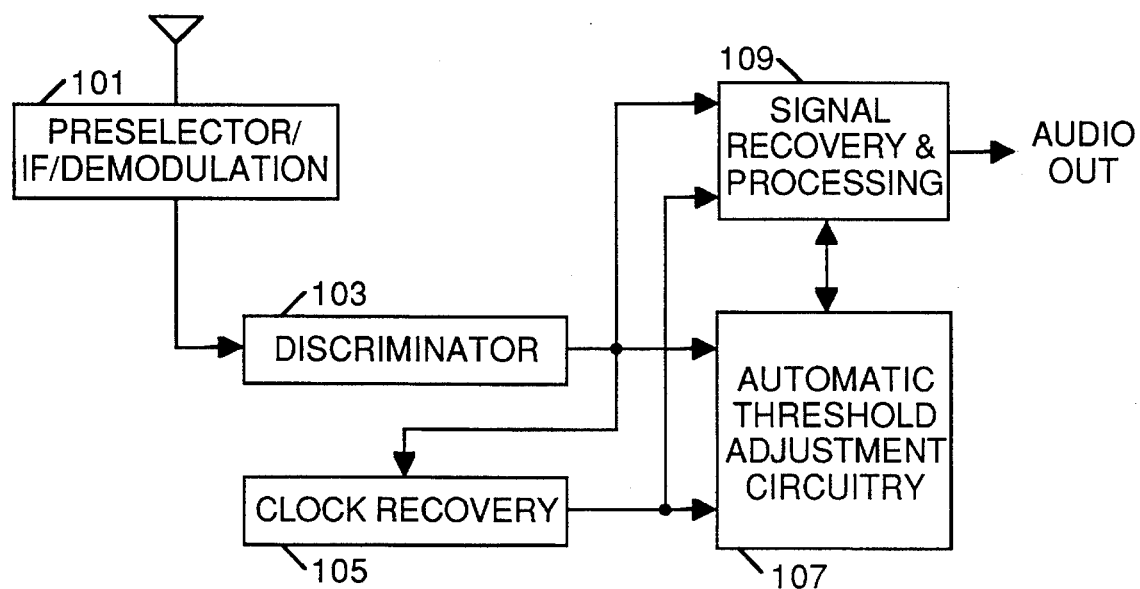
FIG. 1 is a block diagram of a radio receiver having automatic threshold adjustment capability in accordance with the invention.

The following describes a method and apparatus for accurately recovering symbols from multi-level signals. The symbol thresholds are automatically adjusted to various forms of signal degradation, using a fast adjust mode and a slow adjust mode to best suit the situation. The invention can be included in a conventional radio as shown in FIG. 1 and which is capable of receiving multi-level digital signals. One such receiver, by way of example only, is a SPECTRA mobile radio, available from Motorola, Inc.

The invention encompasses a method and apparatus for automatic signal threshold control for recovery of a received multi-level digital signal composed of symbols. The received multi-level digital signal is attenuated in a predetermined fashion, producing an attenuated signal. The attenuated signal is compared to the signal threshold to generate signal information. Signal statistics are computed from the generated signal information and the signal threshold is adjusted in accordance therewith.

Figures 2A, 2B:
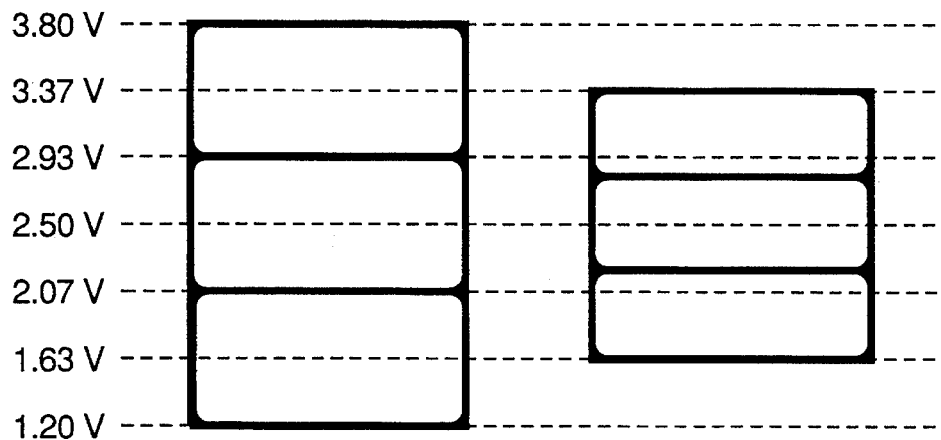
FIG. 2A shows discriminator output levels in accordance with the invention.
FIG. 2B shows attenuated discriminator output levels in accordance with the invention.

FIG. 1 is a block diagram of a suitable radio receiver that includes the capability of automatic threshold adjustment in accordance with the invention. The modulated signal is received in a preselector/IF/demodulation block 101, which provides the demodulated signal to a discriminator 103. The output from the discriminator 103 is fed to a clock recovery block 105, which outputs the recovered dock signal. The discriminator 103 output, as shown in FIG. 2A, and recovered clock signal are fed into an automatic threshold adjustment circuit 107, where the invention is particularly embodied. The thresholds determined by the automatic threshold adjustment circuitry 107 are then fed to the signal recovery and processing block 109 with the recovered clock and discriminator 103 output to thereby produce the desired audio (or data).

The first step in providing the desired automatic threshold control for multi-level signals is to attenuate the received signal such that the maximum and minimum levels of the attenuated signal are halfway between the expected upper and lower symbol levels and the adjacent symbol levels. In the invention, a 4 level signal with ⅔ gain provides the attenuated signal. The received discriminator signal, shown in FIG. 2A, has an expected voltage range of 1.20 V to 3.80 V. The attenuated signal of FIG. 2B has an expected voltage range of 1.63 V to 3.37 V, the end points reflecting the mid-symbol values of the upper and lower symbols. Thus, at radio power-up, the upper threshold value is made 3.37 V, and the lower threshold value is made 1.63 V. Because the receiver is AC coupled, the discriminator bias of 2.50 V is used for the middle symbol threshold, without using any form of threshold adjustment. If it is necessary for the receiver to adjust the 2.50 V bias, such adjustment is performed by placing a threshold adjustment circuit at that threshold, such as one described for the upper and lower thresholds. The upper and lower thresholds are adjusted up and/or down based on the received data, thereby compensating for noise and other signal distortion on the channel.

It has been found advantageous in the present invention to have two separate modes, fast adjust and slow adjust, to modify the upper and lower thresholds. When a signal is first received, fast adjust mode is utilized to quickly lock on to the signal. However, once the threshold control circuitry locks on the signal, slow adjust mode may then be used to maintain good BER (bit error rate) performance. The switch from fast adjust mode to slow adjust mode is performed after a lock on the signal is made, but only if a proper code signal is received from the signal recovery and processing block

109 to insure that the received signal is valid. A switch from slow adjust mode to fast adjust mode occurs when the slow adjust circuitry is no longer able to consistently lock on the signal (called an unlock condition) to allow for quickest possible recovery. This process can be modified to handle other multi-level signals, such as those greater than 4 levels or non-symmetrical sub-bands, by producing one or more attenuated signals such that an attenuated level is available for the level halfway between each of the expected symbol levels. Separate threshold circuitry is then required for each threshold level.

Figure 3A:
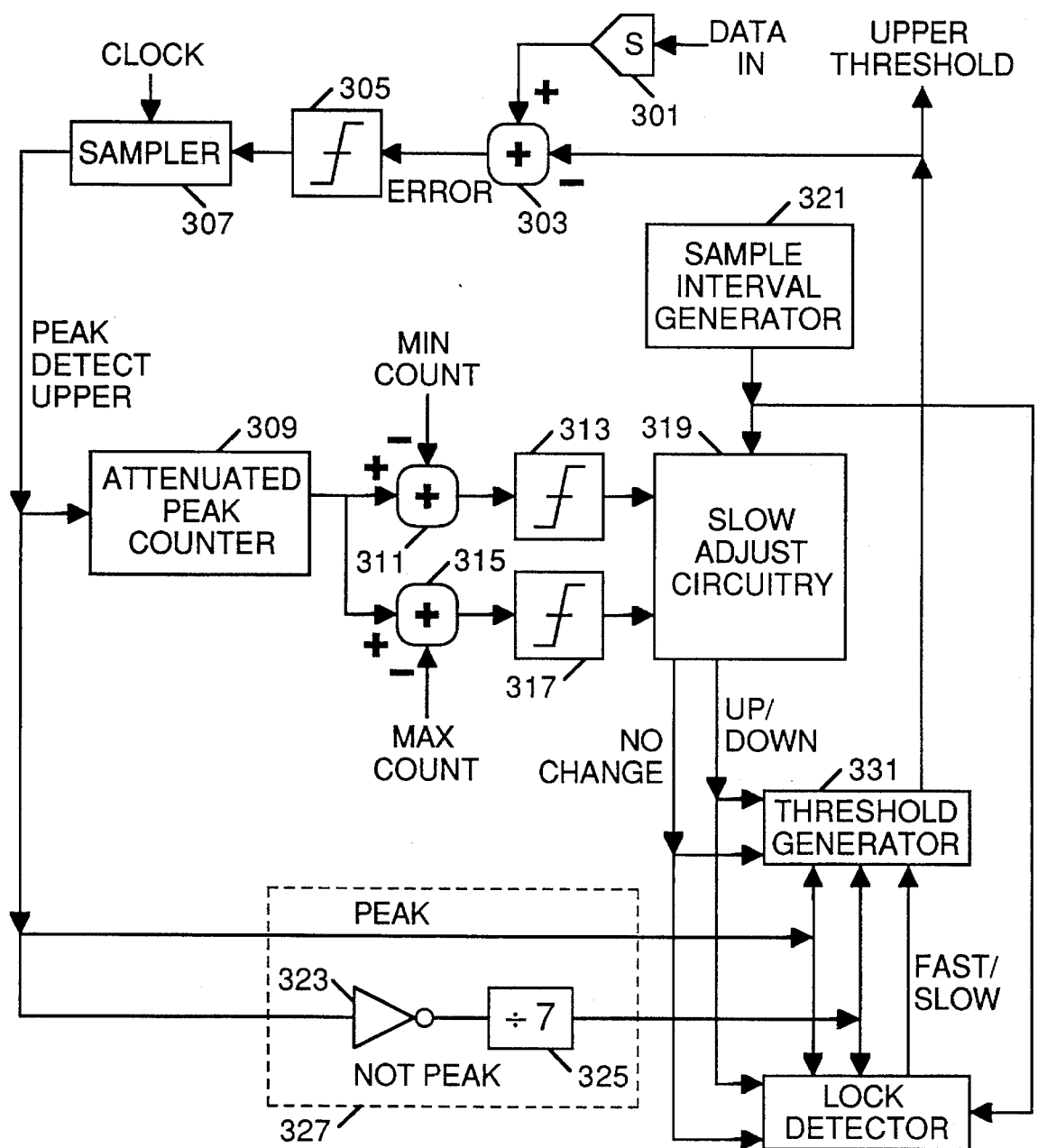
FIG. 3A is a block diagram of an upper threshold adjustment circuit included in the receiver of FIG. 2.

FIG. 3A is a block diagram of an upper threshold adjustment circuit in accordance with the invention. Discriminator data from the discriminator 103 in FIG. 1 enters the upper threshold adjustment circuitry and is amplified by a factor of S at amplifier 301. The value of S is $2/3$. The current value of the UPPER THRESHOLD (output by a threshold generator 331) is subtracted from the attenuated discriminator data at adder 303, producing the ERROR signal for the upper threshold determination. The output of adder 303 is fed into a limiter 305, the output of which is sampled by a sampler 307, using the CLOCK signal (generated by clock recovery block 105 in FIG. 1 ), yielding the signal PEAK DETECT UPPER. The PEAK DETECT UPPER signal is fed into an attenuated peak counter 309, which counts the number of peak detects it receives. The output of the attenuated peak counter 309 is the number of attenuated peaks accumulated over the course of a sample 15 interval, which is fed to two adders 311 and 315. The MIN COUNT value is subtracted from the number of attenuated peaks by adder 311 and the MAX COUNT value is subtracted from the number of attenuated peaks by adder 315. The output of adder 311 is fed to limiter 313, and the output of adder 315 is fed to limiter 317. The output of each of the two limiters 313 and 317 is fed into the slow adjust circuitry 319. The processes of slow adjust mode with respect to determining the upper threshold are in the description for FIG. 4B. The sample interval generator 321 output is fed into the slow adjust circuitry 319 and a lock detector 329 to provide means for counting the proper number of samples in a sample interval. The signals NO CHANGE and UP/DOWN are output from the slow adjust circuitry 319 and are input to the lock detector 329 and threshold generator 331. The PEAK DETECT UPPER signal output by limiter 305 is fed into both the lock detector 329 and threshold generator 331, as well as inverter 323 to produce the NOT PEAK signal, which is divided by 7 in divider 325. The output of divider 325 is fed into both the lock detector 329 and threshold generator 331. The lock detector 329 outputs the FAST/SLOW signal which tells the threshold generator 331 which input, either the slow adjust circuitry 319 output or the fast adjust circuitry 327 output, to use to modify the value of the threshold. The threshold generator 331 outputs the UPPER THRESHOLD, which is used to determine symbol values in the signal recovery and processing block 109 of FIG. 1. The threshold generator 331 uses a 5-bit digital analog converter to adjust the threshold, thus $2^5=32$ steps are available. One step is defined as one "unit." The voltage range of these 32 steps is adjusted to cover the anticipated dynamic range of the threshold for the receiver in which the invention is embodied. That range is 2.70 V to 3.64 V for the upper threshold.

Figure 3B:
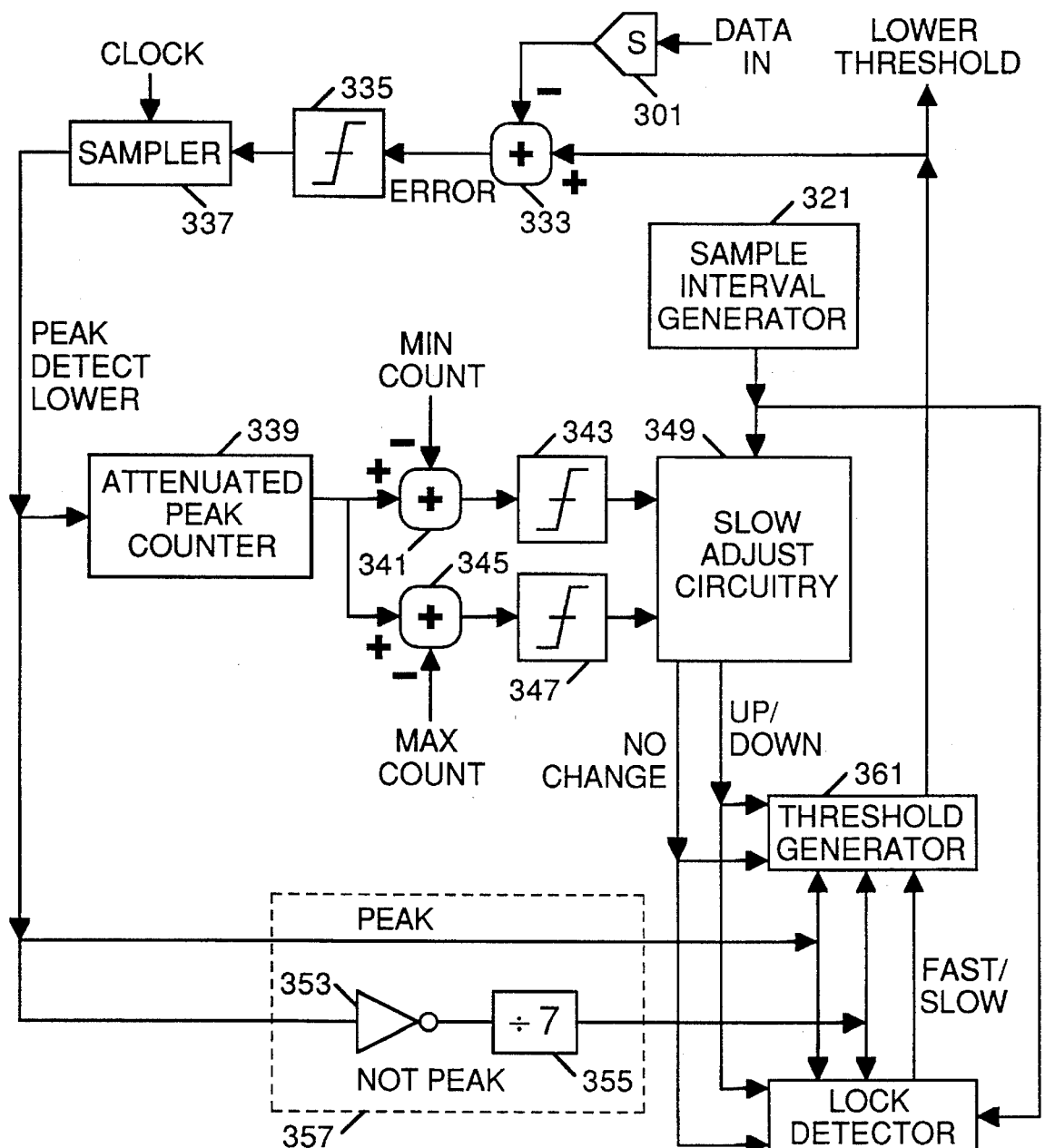
FIG. 3B is a block diagram of a lower threshold adjustment circuit also included in the receiver of FIG. 2.

FIG. 3B is a block diagram of a lower threshold adjustment circuit in accordance with the invention. This block works substantially the same as the block of FIG. 3A, except for the polarity of the signals added in adder 333. Discriminator data from the discriminator 103 in FIG. 1 enters the upper threshold adjustment circuitry and is amplified by a factor of S at amplifier 301. The value of S is $2/3$. This is the same amplifier as in FIG. 3A. The attenuated discriminator data is subtracted from the current value of the LOWER THRESHOLD (output by a threshold generator 361) at adder 333, producing the ERROR signal for the lower threshold determination. The output of adder 333 is fed into a limiter 335, the output of which is sampled by a sampler 337, using the CLOCK signal (generated by dock recovery block 105 in FIG. 1), yielding the signal PEAK DETECT LOWER. The PEAK DETECT LOWER signal is fed into an attenuated peak counter 339, which counts the number of peak detects it receives. The output of the attenuated peak counter 339 is the number of attenuated peaks accumulated over the course of a sample interval, which is fed to two adders 341 and 345. The MIN COUNT value is subtracted from the number of attenuated peaks by adder 341 and the MAX COUNT value is subtracted from the number of attenuated peaks by adder 345. The output of adder 341 is fed to limiter 343, and the output of adder 345 is fed to limiter 347. The output of each of the two limiters 343 and 347 is fed into the slow adjust circuitry 349. The processes of slow adjust mode with respect to determining the lower threshold are in the description for FIG. 4B. The sample interval generator 321 (the same generator as in FIG. 3A.) output is fed into the slow adjust circuitry 349 and a lock detector 359 to provide means for counting the proper number of samples in a sample interval. The signals NO CHANGE and UP/DOWN are output from the slow adjust circuitry 349 and are input to the lock detector 359 and threshold generator 361. The PEAK DETECT LOWER signal output by limiter 335 is fed into both the lock detector 359 and threshold generator 361, as well as inverter 353 to produce the NOT PEAK signal, which is divided by 7 in divider 355. The output of divider 355 is fed into both the lock detector 359 and threshold generator 361. The lock detector 359 outputs the FAST/SLOW signal which tells the threshold generator 361 which input, either the slow adjust circuitry 349 output or the fast adjust circuitry 357 output, to use to modify the value of the threshold. The threshold generator 361 outputs the LOWER THRESHOLD, which is used to determine symbol values in the signal recovery and processing block 109 of FIG. 1. The threshold generator 361 uses a 5-bit digital analog converter to adjust the threshold, thus $2^5=32$ steps are available. One step is defined as one "unit." The voltage range of these 32 steps is adjusted to cover the anticipated dynamic range of the threshold for the receiver in which the invention is embodied. That range is 1.36 V to 2.30 V for the lower threshold. In fast adjust mode, decisions are made as follows. The receiver power-up threshold value is set to the midpoint of the threshold range, which is 16 units. Whenever a threshold adjustment is made, adjustments are made in increments of two units to more quickly reach the optimal threshold level. Each time an attenuated symbol is measured which is above the upper threshold, that threshold is increased. Each time a symbol is measured which is below the upper threshold, a value called symbol count is increased by one. A separate symbol count is kept for each threshold generator. (Each time an attenuated symbol is measured which is below the lower threshold, that threshold is decreased. Each time an attenuated symbol is measured which is above the lower threshold, a value called symbol count is increased by one.) If the value of symbol count reaches 7, the upper threshold is decreased by two units (increased in the case of the lower threshold), and the symbol count is set to 0. The count of seven was chosen for statistical reasons. Each of the four possible received symbols is of equal probability of being received, hence 25% chance of receiving a particular symbol. In the case of receiving the upper or lower symbol level, there is a 50% chance of an attenuated symbol value being slightly above the threshold and 50% chance of an attenuated symbol value being slightly below that threshold if the threshold is set properly. Thus 0.25 multiplied by 0.50 equals 0.125 or ⅛ gives the probability of any symbol appearing above the upper threshold (or below the lower threshold). Consequently, ⅞ of the attenuated symbols should be below the threshold, thus giving the value of 7 for the decision level for decreasing the threshold.

To determine a lock condition in fast mode, a symbol interval count is kept, such that a counter value is increased by one every time a symbol is received. The value of the threshold when the symbol interval count is 0 is stored as the previous threshold. When the symbol interval count reaches 128, a lock condition is determined if the previous threshold and the current threshold value are the same, providing the net change in threshold is zero. The net change is the total number of increases less the total number of decreases over the symbol interval. For example, a threshold of 20 units with 3 increases and 3 decreases constitutes a lock condition. A threshold of 0 units with 10 decreases and 0 increases does not constitute a lock condition, because the threshold has been pushed to one of its end-points. If the two threshold values are not the same, the previous threshold value is set to the value of the current threshold, the symbol interval count is set to 0, and fast adjust mode is continued until a lock condition is detected.

Figure 4A:
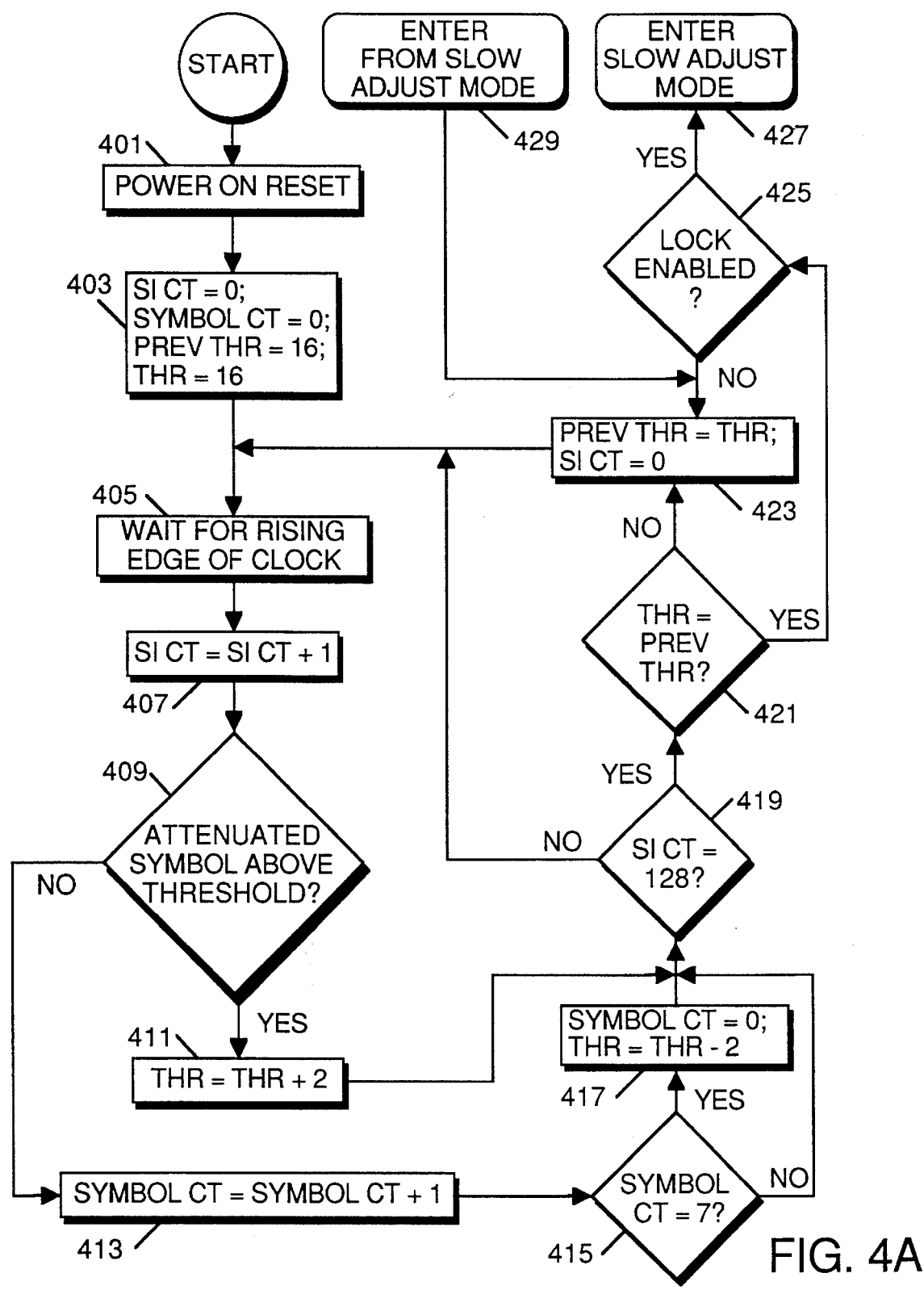
FIG. 4A is a flowchart showing fast adjust mode for decision thresholds as depicted in FIG. 3A.

FIG. 4A is a flowchart showing fast adjust mode for decision thresholds in accordance with the invention. The following describes the process occurring in that flowchart to generate the upper threshold. At start-up, a power on reset occurs when electrical power is initially applied to the receiver, as indicated at step 401. At this time, SI CT and SYMBOL CT are set to 0, and PREV THR and THR are set to 16 units, as shown in step 403. When the next rising edge of dock occurs at step 405, SI CT is increased by 1 at step 407. If the attenuated discriminator value of the symbol is above the threshold at step 409, THR is increased by 2 units at step 411, and the process continues with step 419. If the attenuated discriminator value is not above the threshold at step 409, SYMBOL CT is increased by 1 at step 413. If SYMBOL CT equals 7 at step 415, SYMBOL CT is set to 0 and THR is decremented by 2 units at step 417, after which the process continues with step 419. If SYMBOL CT does not equal 7 at step 415, the process continues with step 419. If SI CT does not equal 128 at step 419, then process continues with step 405. If SI CT equals 128 at step 419, the process continues with step 421. If THR equals PREV THR at step 421 and the lock is enabled at step 425, then the process enters slow adjust mode at step 427, as is described later for FIG. 4B. If THR does not equal PREV THR at step 421 or if the lock is not enabled at step 425, PREV THR is set to THR and SI CT is set to 0, and the process continues with step 405. Fast adjust mode begins with step 423 if it is entered from slow adjust mode at step 429.

Steps 409, 411 and 417 in FIG. 4A are modified to generate the lower threshold in fast adjust mode (all other steps remaining the same). In step 409, if the attenuated symbol is/is not below the threshold, the process continues as described earlier. The threshold is decreased by 2 in step 411. In step 417, THR is increased by 2, and SYMBOL CT is set to 0.

In slow adjust mode, decisions are made as follows. The initial threshold value is the threshold value from fast adjust mode, since slow adjust mode is only entered from fast adjust mode. Adjustments are only made after a sample interval, which is 128 symbols in length. Whenever a threshold adjustment is made, adjustments are made in increments of one unit. Thus, the optimal threshold level is retained longer for better BER performance. During each sample interval, a symbol count is kept for the number of symbols during that sample interval when the value of the attenuated symbol is beyond the threshold. As was described for the fast adjust mode, ⅛ attenuated symbols is expected to be beyond the threshold when the threshold is set properly. Thus, for 128 symbols, 1 out of 8 of those symbols or ¹²⁸⁄₈ equals 16 symbols expected to fall above the upper threshold (or below the lower threshold). The value of 16 expected symbols is expanded to a window from 13 (MIN COUNT) to 19 (MAX COUNT) attenuated symbols to account for expected statistical variance. The upper threshold is increased (or lower threshold is decreased) if greater than 19 attenuated symbols fall beyond the current threshold (above the upper threshold, below the lower threshold), the upper threshold is decreased (or the lower threshold is increased) if less than 13 attenuated symbols fall beyond the current threshold, and the threshold is kept the same if 13 to 19 symbols fall beyond the current threshold. In the slow adjust mode, the unlock condition is detected if the threshold is adjusted up 8 consecutive times or down 8 consecutive times.

Figure 4B:
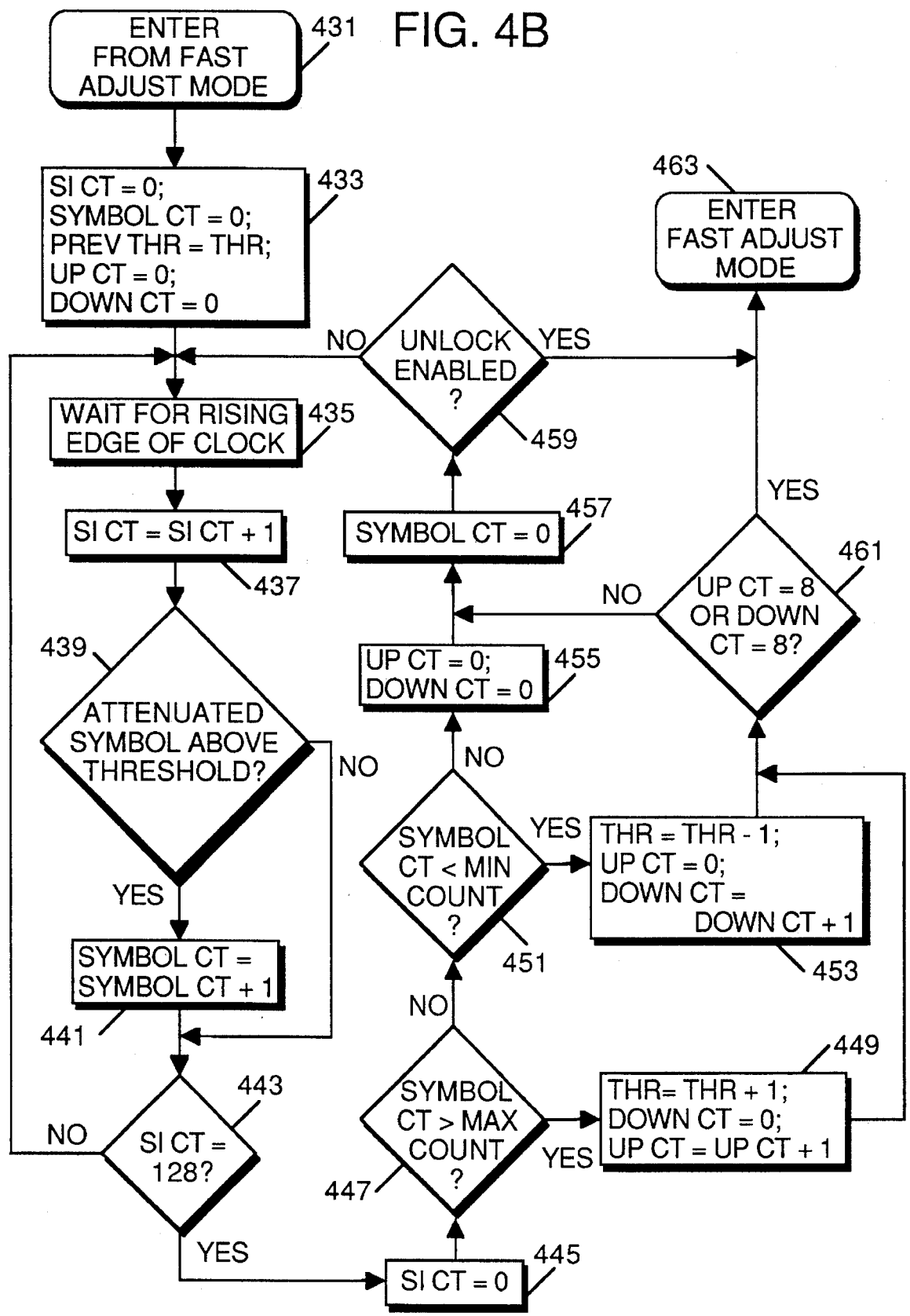
FIG. 4B is a flowchart showing slow adjust mode for decision thresholds as depicted in FIG. 3A.

FIG. 4B is a flowchart showing slow adjust mode for decision thresholds in accordance with the invention. The following describes the process occurring in that flowchart to generate the upper threshold. Slow adjust mode is entered from fast adjust mode at step 431. SI CT, SYMBOL CT, DOWN CT, and UP CT are all set to 0, and PREV THR is set to THR at step 433. When the next rising edge of clock occurs at step 435, SI CT is increased by 1 at step 437. If the attenuated discriminator value of the symbol is above the threshold at step 439, SYMBOL CT is increased by 1 at step 441. The process continues with step 443 if the attenuated discriminator value is not above the threshold at step 439. If SI CT does not equal 128 at step 443, the process continues with step 435. If SI CT equals 128 at step 443, SI CT is set to 0 at step 445. If SYMBOL CT is not greater than MAX COUNT, 19, at step 447, the process continues with step 45 1. If SYMBOL CT is greater than MAX COUNT at step 443, THR is increased by 1 unit, DOWN CT is set to 0, and UP CT is increased by 1 at step 449, after which the process continues with step 461. If SYMBOL CT is not less than MIN COUNT, 13, at stop 451, UP CT and DOWN CT are set to 0 at stop 455, and the process continues with step 457. If SYMBOL CT is less than MIN COUNT at stop 451, THR is decreased by 1, UP CT is set to 0, and DOWN CT is increased by 1 at stop 453. If either UP CT or DOWN CT equals 8 at stop 461, fast adjust mode is entered at step 463, otherwise the process continues with step 457. SYMBOL CT is set to 0 at stop 457. If unlock is enabled at stop 459, fast adjust mode is entered at step 463. If unlock is not enabled at stop 459, the process continues with stop 435.

Steps 439, 449 and 453 in FIG. 4A are modified to generate the lower threshold in slow adjust mode (all other steps remaining the same). In step 439, if the attenuated symbol is/is not below the threshold, the process continues as described earlier. In step 449, THR is decreased by 1, UP CT is set to 0, and DOWN CT is increased by 1. In stop 453, THR is increased by 1, DOWN CT is set to 0, and UP CT is increased by 1.

One successful implementation of the present invention involves the fabrication of the necessary circuitry in a 2 micron standard cell ASIC (Application Specific Integrated Circuit), such as is available from Motorola, Inc., although it will be readily appreciated that other successful implementations are possible, such as in discrete component form, or by way of a microprocessor controlled by appropriate software, or, perhaps in a programmable logic array. Other implementations may well come to mind.

What is claimed is:

1. An apparatus for automatic threshold control for recovery of a received multi-level digital signal composed of symbols and having an amplitude, comprising:

means for amplifying the received multi-level digital signal in a predetermined fashion, producing an amplified signal;

means for providing at least a first threshold based on the amplitude of the received multi-level digital signal;

means, coupled to said means for providing, for comparing said amplified signal to said first threshold to generate signal information;

means, coupled to said comparing means, for computing signal statistics from said generated signal information and adjusting at least said first threshold in accordance therewith; and means, receiving as inputs the received multi-level digital signal and said adjusted first threshold, for recovering at least one symbol using said received multi-level signal and said at least said adjusted first threshold.

2. The apparatus of claim 1 wherein said means for adjusting further comprises means for deciding whether said first threshold needs adjusting after every symbol is received.

3. The apparatus of claim 1 wherein said means for adjusting further comprises means for deciding whether said first threshold needs adjusting after a plurality of symbols is received.

4. The apparatus of claim I wherein said means for adjusting further comprises:

means for deciding whether said first threshold needs adjusting after every symbol is received;

means for deciding whether said first threshold needs adjusting after a plurality of symbols is received; and means for determining when to decide whether said first threshold needs adjusting after every symbol is received and when to decide whether said first threshold needs adjusting after said plurality of symbols is received.

5. The apparatus of claim 1 wherein said amplified signal is an attenuated signal that has a peak value that is substantially equal to a threshold for the received multi-level digital signal.

6. The apparatus of claim 1 wherein said signal statistics comprise a first count of the number of times said first threshold is increased during a measurement period and a second count of the number of times said first threshold is decreased during said measurement period.

7. The apparatus of claim 1 wherein said signal statistics comprise a first count of comparison that result from said amplified signal falling above said first threshold during a measurement period and a second count of comparisons that result from said amplified signal falling below said first threshold during said measurement period.

8. The apparatus of claim 7, wherein said means for computing and adjusting further comprises:

first means for comparing said first count to an above value, wherein said above value represents how many symbols are expected to fall above said first threshold during said measurement period;

second means for comparing said second count to a below value, wherein said below value represents how many symbols are expected to fall below said first threshold during said measurement period;

means, operatively coupled to said first means for comparing, for adjusting said first threshold to a value above said first threshold when said first count is greater than said above value; and means, operatively coupled to said second means for comparing, for adjusting said first threshold to a value below said first threshold when said second count is greater than said below value.

9. The apparatus of claim 1, wherein said means for computing and adjusting further comprises:

means, operatively coupled to said means for comparing, for increasing said first threshold when said symbol falls above said first threshold;

means, operatively coupled to said means for comparing, for increasing a symbol count when said symbol falls below said first threshold; and means, operatively coupled to said means for increasing said symbol count, for decreasing said first threshold when said symbol count reaches a predetermined value.

10. The method of claim 9, wherein said predetermined value represents how many symbols are expected to fall below said first threshold when said first threshold is correctly adjusted.

11. A method for automatic threshold control for recovery of a received multi-level digital signal composed of symbols and having an amplitude, comprising the steps of:

amplifying the received multi-level digital signal in a predetermined fashion, producing an amplified signal;

providing at least a first threshold based on the amplitude of the received multi-level signal;

comparing said amplified signal to said first threshold to generate signal information;

computing, responsive to said step of comparing, signal statistics from said generated signal information and adjusting at least said first threshold in accordance therewith; and recovering at least one symbol using said received multi-level signal and at least said adjusted first threshold.

12. The method of claim 11 wherein said step of adjusting further comprises the step of deciding whether said first threshold needs adjusting after every symbol is received.

13. The method of claim 11 wherein said step of adjusting further comprises the step of deciding whether said first threshold needs adjusting after a plurality of symbols is received.

14. The method of claim 11 wherein said step of adjusting further comprises the steps of:

determining when to decide whether said first threshold needs adjusting after every symbol is received and when to decide whether said first threshold needs adjusting after said plurality of symbols is received;

deciding whether said first threshold needs adjusting after every symbol is received when it is determined that it is time to decide whether said first threshold needs adjusting after every symbol is received; and deciding whether said first threshold needs adjusting after a plurality of symbols is received when it is determined that it is time to decide whether said first threshold needs adjusting after a plurality of symbols is received.

15. The method of claim 11 wherein said amplified signal is an attenuated signal that has peak value that is substantially equal to a threshold for the received multi-level distal signal.

16. The method of claim 11 wherein said signal statistics comprise a first count of the number of times said first threshold is increased during a measurement period and a second count of the number of times said first threshold is decreased during said measurement period.

17. The method of claim 11 wherein said signal statistics comprise a first count of comparison that result from said amplified signal falling above said first threshold during a measurement period and a second count of comparisons that result from said amplified signal falling below said first threshold during said measurement period.

18. The method of claim 17, wherein said step of computing and adjusting further comprises the steps of:
    comparing said first count to an above value, wherein said above value represents how many symbols are expected to fall above said first threshold during said measurement period;
    comparing said second count to a below value, wherein said below value represents how many symbols are expected to fall below said first threshold during said measurement period;
    adjusting said first threshold to a value above said first threshold when said first count is greater than said above value; and
    adjusting said first threshold to a value below said first threshold when said second count is greater than said below value.

19. The method of claim 11 wherein said step of computing and adjusting further comprises the steps of:
    increasing said first threshold when said symbol falls above said first threshold;
    increasing a symbol count when said symbol falls below said first threshold; and
    decreasing said first threshold when said symbol count reaches a predetermined value.

20. The method of claim 19, wherein said predetermined value represents how many symbols are expected to fall below said first threshold when said first threshold is correctly adjusted.

21. A receiver with apparatus for automatic threshold control for recovery of a received multi-level digital signal composed of symbols and having an amplitude, comprising:
    means for receiving a multi-level digital signal composed of symbols;
    means for amplifying said received multi-level digital signal in a predetermined fashion, producing an amplified signal;
    means for providing at least a first threshold based on the amplitude of the received multi-level signal;
    means, coupled to said means for providing, for comparing said amplified signal to said first threshold to generate signal information;
    means, coupled to said comparing means, for computing signal statistics from said generated signal information and adjusting at least said first threshold in accordance therewith; and
    means, receiving as inputs said received multi-level digital signal and said adjusted first threshold, for recovering at least one symbol using said received multi-level signal and said at least said adjusted first threshold.

22. The apparatus of claim 21 wherein said means for adjusting further comprises means for deciding whether said first threshold need adjusting after every symbol is received.

23. The apparatus of claim 21 wherein said means for adjusting further comprises means for deciding whether said first threshold needs adjusting after a plurality of symbols is received.

24. The apparatus of claim 21 wherein said means for adjusting further comprises:
    means for deciding whether said first threshold needs adjusting after every symbol is received;
    means for deciding whether said threshold needs adjusting after a plurality of symbols is received; and
    means for determining when to decide whether said first threshold needs adjusting after every symbol is received and when to decide whether said first threshold needs adjusting after said plurality of symbols is received.

25. The apparatus of claim 21 wherein said amplified signal is an attenuated signal that has a peak value that is substantially equal to a threshold for the received multi-level digital signal.

26. The apparatus of claim 21 wherein said signal statistics comprise a first count of the number of times said first threshold is increased during a measurement period and a second count of the number of times said first threshold is decreased during said measurement period.

27. The apparatus of claim 21 wherein said signal statistics comprise a first count of comparisons that result from said amplified signal falling above said first threshold during a measurement period and a second count of comparisons that result from said amplified signal falling below said first threshold during said measurement period.

28. The apparatus of claim 27, wherein said means for computing and adjusting further comprises:
    first means for comparing said first count to an above value, wherein said above value represents how many symbols are expected to fall above said first threshold during said measurement period;
    second means for comparing said second count to a below value, wherein said below value represents how many symbols are expected to fall below said first threshold during said measurement period;
    means, operatively coupled to said first means for comparing, for adjusting said first threshold to a value above said first threshold when said first count is greater than said above value; and
    means, operatively coupled to said second means for comparing, for adjusting said first threshold to a value below said first threshold when said second count is greater than said below value.

29. The apparatus of claim 21, wherein said means for computing and adjusting further comprises:
    means, operatively coupled to said means for comparing, for increasing said first threshold when said symbol falls above said first threshold;
    means, operatively coupled to said means for comparing, for increasing a symbol count when said symbol falls below said first threshold; and
    means, operatively coupled to said means for increasing said symbol count, for decreasing said first threshold when said symbol count reaches a predetermined value.

30. The method of claim 29, wherein said predetermined value represents how many symbols are expected to fall below said first threshold when said first threshold is correctly adjusted.

31. A method of adjusting a threshold for use in recovering a symbol from a received multi-level signal comprising the steps of:

a) setting an upper threshold to a first value;

b) setting a symbol count to a second value;

c) receiving a plurality of symbols and attenuating the plurality of symbols yielding a plurality of attenuated symbols;

d) when a first symbol from the plurality of attenuated symbols is above the upper threshold, increasing the upper threshold;

e) when a second symbol from the plurality of attenuated symbols is below the upper threshold, increasing the symbol count;

f) when the symbol count reaches a third value, decreasing the upper threshold and setting the symbol count to a fourth value; and g) recovering at least one symbol using the plurality of symbols and the upper threshold.

32. The method of claim 31, further comprising the steps of:

g) when X symbols are counted, where X is an integer, compare the first value with the upper threshold;

h) when the first value is different from the upper threshold, setting the first value to the current value of the upper threshold, and continue with step c);

i) when the first value is the same as the upper threshold, considering the upper threshold to be in a lock condition.

33. The method of claim 32, wherein X is 128.

34. The method of claim 32, when the upper threshold is considered to be in the lock condition, further comprising the steps of:

j) setting a minimum count to a fifth value;

k) setting a maximum count to a sixth value;

l) during a sample interval of X symbols, counting how many of the X symbols are above the upper threshold, yielding a first count;

m) when the first count is greater than the maximum count, increasing the upper threshold;

n) when the first count is less than the minimum count, decreasing the upper threshold;

o) repeating steps j) through n).

35. The method of claim 34, further comprising the steps of:

p) count Y consecutive repetitions of steps j) through n), where Y is an integer;

q) when the upper threshold is increased on each of the Y repetitions, considering an unlock condition to be detected, and continuing the process with step c);

r) when the upper threshold is decreased on each of the Y repetitions, considering an unlock condition to be detected, and continuing the process with step c)

s) when neither the condition of step q) nor the condition of step r) is met, repeating from step p).

36. The method of claim 35, wherein the fifth value is 13; wherein the sixth value is 19; and wherein Y is 8.

37. The method of claim 31, wherein the first value is the midpoint of possible values for the upper threshold; wherein the second value is 0; wherein the third value is 7; and wherein the fourth value is 0.

38. A method of adjusting a threshold for use in recovering a symbol from a received multi-level signal comprising the steps of:

a) setting a lower threshold to a first value;

b) setting a symbol count to a second value;

c) receiving a plurality of symbols and attenuating the plurality of symbols, yielding a plurality of attenuated symbols;

d) when a first symbol from the plurality of attenuated symbols is below the lower threshold, decreasing the lower threshold;

e) when a second symbol from the plurality of attenuated symbols is above the lower threshold, increasing the symbol count;

f) when the symbol count reaches a third value, increasing the lower threshold and setting the symbol count to a fourth value; and g) recovering at least one symbol using the plurality of symbols and the lower threshold.

39. The method of claim 38, further comprising the steps of:

g) when X symbols are counted, where X is an integer, compare the first value with the lower threshold;

h) when the first value is different from the lower threshold, setting the first value to the current value of the lower threshold;

i) when the first value is the same as the lower threshold, considering the lower threshold to be in a lock condition.

40. The method of claim 39, wherein X=128.

41. The method of claim 39, when the lower threshold is considered to be in the lock condition, further comprising the steps of:

j) setting a minimum count to a fifth value;

k) setting a maximum count to a sixth value;

l) during a sample interval of X symbols, counting how many of the X symbols are below the lower threshold, yielding a first count;

m) when the first count is greater than the maximum count, decreasing the lower threshold;

n) when the first count is less than the minimum count, increasing the lower threshold;

o) repeating steps j) through n).

42. The method of claim 41, further comprising the steps of:

p) count Y consecutive repetitions of steps j) through n), where Y is an integer;

q) when the lower threshold is increased on each of the Y repetitions, considering an unlock condition to be detected, and continuing the process with step c);

r) when the lower threshold is decreased on each of the Y repetitions, considering an unlock condition to be detected, and continuing the process with step c)

s) when neither the condition of step q) nor the condition of step r) is met, repeating from step p).

43. The method of claim 42, wherein the fifth value is 13; wherein the sixth value is 19; and wherein Y is 8.

44. The method of claim 38, wherein the first value is the midpoint of possible values for the lower threshold; wherein the second value=0; wherein the third value=7; and wherein the fourth value=0.

* * * * *